United States Patent

[11] 3,587,018

[72] Inventors Howard R. Jaquith
Rochester;
James L. McCarthy, Chili, both of, N.Y.;
Nathaniel B. Nichols, Colton, Calif.; Stanley
C. Norton, Jr., Spencerport, N.Y.
[21] Appl. No. 858,227
[22] Filed July 30, 1969
Division of Ser. No. 409,884 Nov. 9, 1964,
Pat. No. 3,480,854.
[45] Patented June 22, 1971
[73] Assignee Sybron Corporation

[54] CORE AND HOUSING STRUCTURE OF MAGNETIC FLUX TRANSDUCER
6 Claims, 9 Drawing Figs.
[52] U.S. Cl. .................................... 336/92,
336/30, 336/110, 336/135, 336/210, 336/234
[51] Int. Cl. ....................................... H01f 27/02,
H01f 27/26
[50] Field of Search ......................... 336/65, 92,
90, 210, 212, 233, 234, 217, 130, 132, 135, 110

[56] References Cited
UNITED STATES PATENTS
| | | | |
|---|---|---|---|
| 567,250 | 9/1896 | Moody | 336/217 X |
| 2,583,353 | 1/1952 | Bishofberger | 336/92 X |
| 2,641,743 | 6/1953 | Bonanno | 336/92 X |
| 2,929,038 | 3/1960 | Sonesson | 336/217 X |
| 3,058,039 | 10/1962 | Ray | 336/210 X |

Primary Examiner—Thomas J. Kozma
Attorneys—Peter J. Young, Jr. and Joseph C. MacKenzie ABSTRACT: A square core is mounted in a housing with opposite legs only clamped to the core, one leg clamped by a cantilever spring which allows the core to expand in its plane under the influence of temperature. The legs are essentially single lamina, each of which is made up of a pair of Mumetal strips spotwelded together. The other legs have energizing, sensing and feedback coils thereabout, which coils are wholly supported by and within the housing.

INVENTORS
HOWARD R. JAQUITH
JAMES E. McCARTHY
NATHANIEL B. NICHOLS
STANLEY C. NORTON, JR.

BY

ATTORNEY

INVENTORS
HOWARD R. JAQUITH
JAMES E. MCCARTHY
NATHANIEL B. NICHOLS
STANLEY C. NORTON, JR.

BY

*Theodore B. Roessel*

ATTORNEY

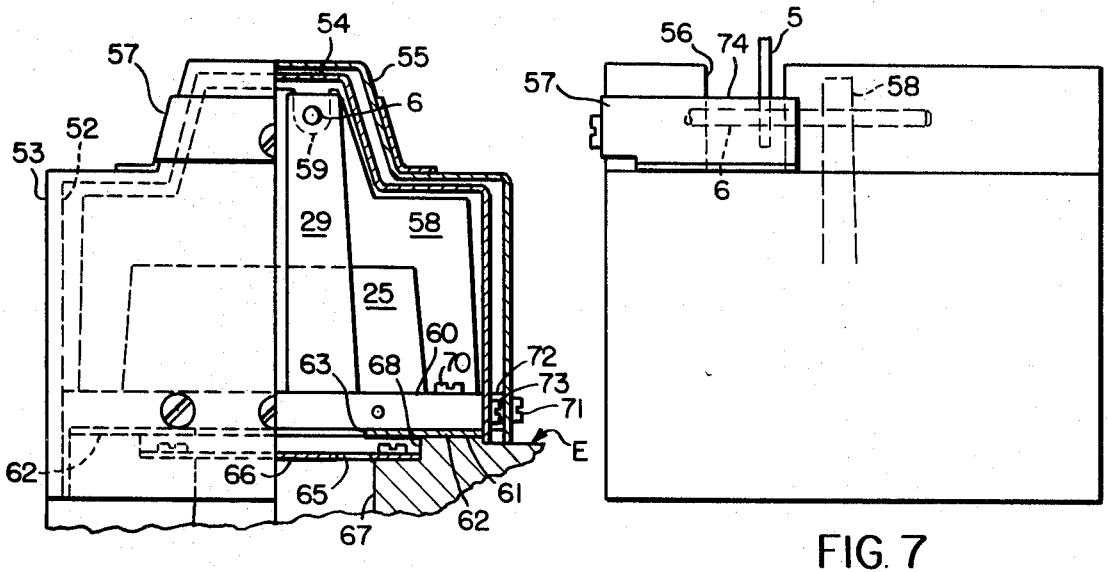
FIG. 6
FIG. 7
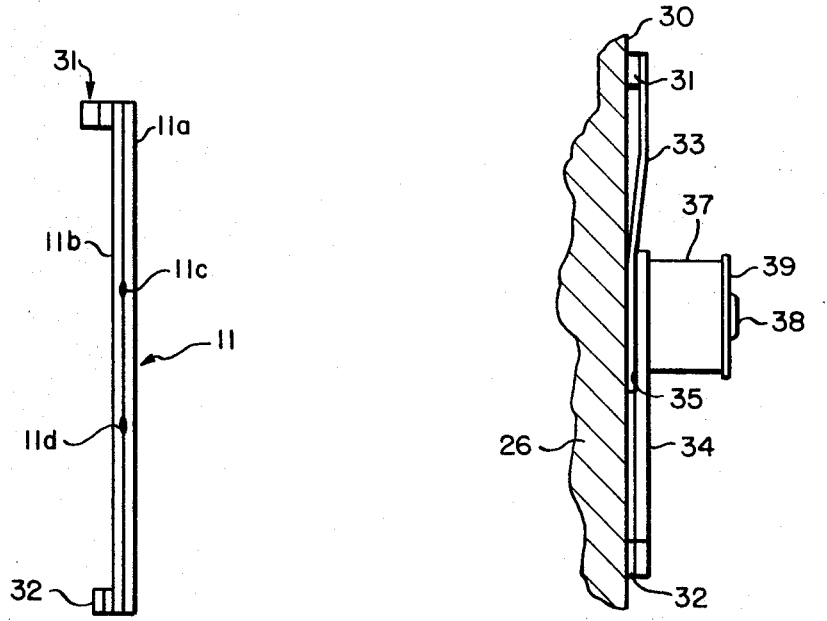
FIG. 8
FIG. 5
INVENTORS
HOWARD R. JAQUITH
JAMES E. MCCARTHY
NATHANIEL B. NICHOLS
STANLEY C. NORTON, JR.
BY Theodore B. Roessel
ATTORNEY 3,587,018

CORE AND HOUSING STRUCTURE OF MAGNETIC FLUX TRANSDUCER

Further, the present application is a division of our copending application, Ser. No. 409,884, filed Nov. 9, 1964, now U.S. Pat. No. 3,480,854, issued and entitled "Movable Magnet Magnetic Flux Transducers and Transduction System For Indicating Magnet Position."

This invention relates to, and it is its general object to provide, improvements in magnetic flux transducers and transduction systems such as are described and claimed in the copending application for U.S. Patent of James Federici and Otto Muller-Girard, Ser. No. 406,068 filed Oct. 23, 1964, entitled TRANSDUCER AND TRANSDUCTION SYSTEM, and assigned to the assignee of the present invention, and now U.S. Pat. No. 3,411,076, issued Nov. 12, 1968.

A magnetic flux transducer according to the present invention is provided with a magnet which is swung through an arcuate path, whereas the transducers disclosed in the said copending application of Federici et al. have magnets executing rectilinear motions.

Again, a magnetic flux transducer according to the present invention includes a saturable core which is of such form, and is so constructed and arranged, as to have improved efficiency, stability of magnetic properties and freedom from undesirable effects due to temperature.

Finally, the present invention provides novel housing and support means providing such functions as making the transducer safe for use in hazardous areas, connecting the transducer to standard condition responsive elements, and protecting the transducer from stray fields and magnetic debris.

The particular objects of the invention will be obvious from the foregoing, especially in view of the detailed description, to follow, and the claims appended hereto.

IN THE DRAWINGS:

FIG. 5 shows a detail of FIGS. 3 and 4;

FIG. 6 shows a shielding and housing assembly for the assembly of FIGS. 3 and 4;

FIG. 7 is another view of the shielding and housing assembly of FIG. 6;

FIG. 8 shows a preferred form of core structure, according to the invention.

Figure 1:
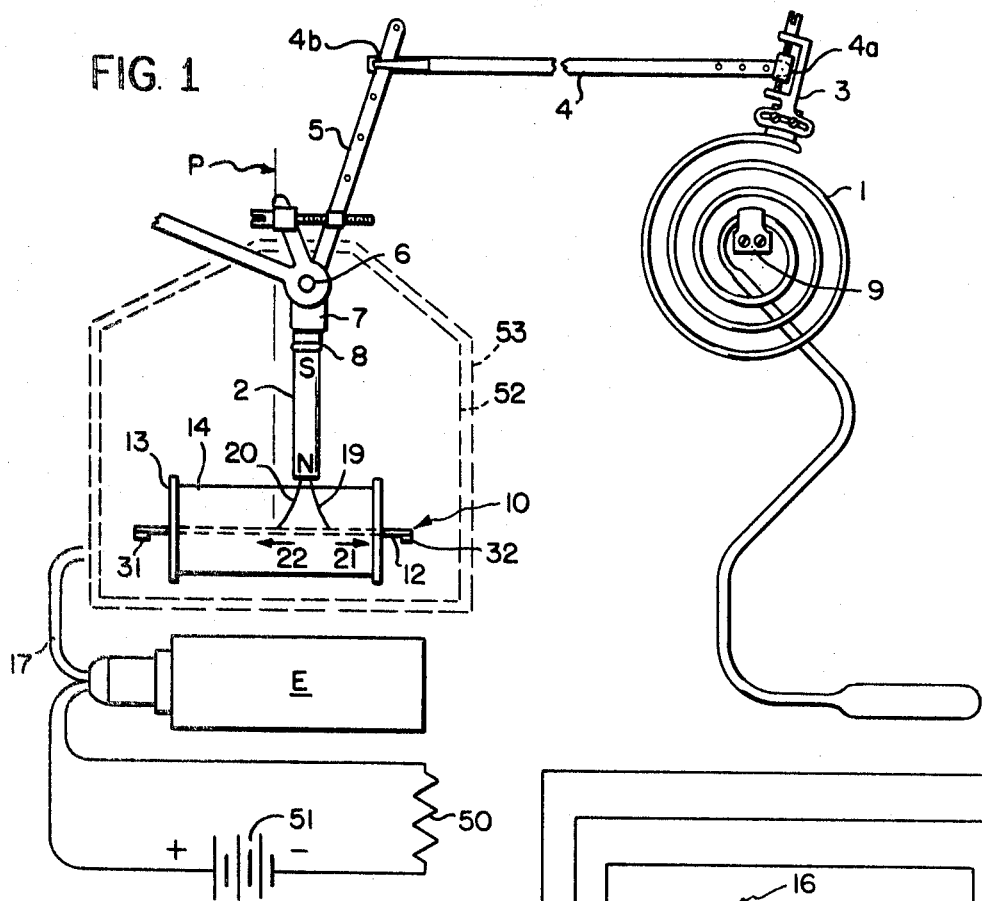
FIG. 1 is a diagrammatic view of a transduction system having therein a transducer according to the invention.

In FIG. 1, a Bourdon tube 1 is arranged to deflect a magnet 2, by means of a typical linkage including a takeoff arm 3, a link 4, and a crank arm 5. Crank arm 5 extends radially from a rotary shaft 6, which has an internally threaded sleeve 7 extending therefrom and into which a threaded element 8, integrally secured to one end of magnet 2, screws.

The rotary axis of shaft 6 is of course normal to the plane of rotation and normally would extend more or less parallel to the axis about which Bourdon tube 1 deflects its takeoff arm 3. Link 4 may be pivoted at 4a and 4b to takeoff arm 3 and crank arm 5 respectively by means (which need not be described) that permit the ends of the link to be adjusted to various distances from the deflection axis of crank arm 5 and takeoff arm 3. Moreover, means (which need not be described) may also be provided to adjust both the angle that the length of magnet 2 makes with the crank arm 5 in the plane of the figure, and the angle in the plane of the drawing between the length of the takeoff arm 3 and the length of link 4 at some given pressure in Bourdon tube 1. Tube 1 is provided with a mounting member 9 which fixes the inner end of the tube to a fixed support (not shown) to which shaft 6 is, in effect, fixedly yet rotatably secured in place. The various above-described adjustment features for the four-bar linkage defined by takeoff arm 3, link 4 and crank arm 5 are conventional, and their like is generally provided in order to provide for defining some given relationship between the motion of Bourdon tube 1 and the crank 5. In actual examples, such relationship is more likely to be defined in terms of the pressure in tube 1 and the effect on transducer action produced upon moving crank arm 5 to various positions about the axis of rotation of shaft 6.

The symbols S and N denote that the axis of polarization of magnet 2 is substantially coincident with the radius on which the N-pole of the magnet 2 deflects. Conveniently, magnet 2 may be in the form of a cylindrical bar, the cylindrical axis of which is also substantially coincident with said radius.

Arranged in fixed position below the magnet 2 is a rectangular core 10, the plane of which is normal to the plane of deflection of the magnet 2, and more or less normal to the radius of deflection of the magnet. Consequently, the magnetic flux lines emitted by the N-pole of magnet 2 cut the core 10 downwardly.

Figure 2:
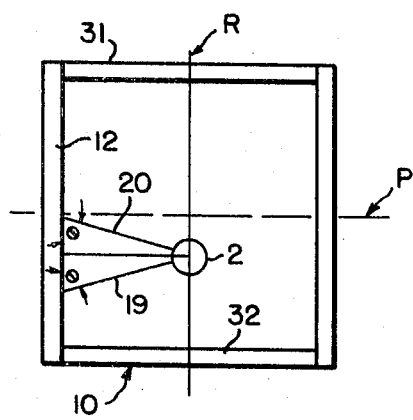
FIG. 2 is a sketch elucidating the principle of operation of the aforesaid transducer.

FIG. 2 portrays core 10 as seen from above the plane thereof. When the magnet's axis of polarization is in a plane which is normal to the plane of FIG. 2 and bisects the said core (as along line R lying in the plane of the core and forming an axis of bilateral symmetry for said core), the radial symmetry of the magnet's field causes the flux condition of leg 11 to be the mirror image of the flux condition of leg 12, insofar as the effect of magnet 2 is concerned. This supposes that the polarization axis of magnet 2 is the radial symmetry axis of the magnet's field. It is to be noted that core 10 is oriented in FIG. 2 in such fashion that the plane of deflection of magnet 2 is normal to the plane of the drawing and contains line R.

Magnet 2, and legs 11 and 12, FIGS. 1 and 2 hereof, are in the same relationship as the like numbered elements of FIG. 1 of the above-identified application of Federici et al., except that in the latter the axis of polarization of the magnet is coincident with the line denoted by R in FIGS. 1 and 2 of Federici et al., and executes only translatory movements. Again, in FIGS. 5 and 6 of Federici et al., the axis of polarization of a magnet 200 is always normal to the plane of a core 100, and executes only translatory movements along such normal.

In the present case, however, the magnet moves angularly, and therefore its N-pole moves both in directions parallel to the plane of core 10 and normal to it. If core 10 be fitted out with various windings and electrical circuitry such as is disclosed in the Federici at al. application, we find that in terms of the arcuate path of the N-pole of magnet 2, said arcuate path can be about three times the maximum length of the corresponding paths of the magnets of the transducer arrangements described by Federici at al., and yet retain the same degree of linearity between transduction system input and output. For example, for an N-pole, inches from its deflection axis (for purposes of explanation, the N-pole of magnet 2 hereof may be supposed to be a point at the face of the pole and on the polarization axis of the magnet), the magnet may sweep out a sector of about 15° with good linearity of output relative to input, which means that the hypothetical N-pole moves a total of nearly one-third inch.

At the same time, the increased input motion capability of our novel transducer is obtained with the known advantages of angular input mechanisms as opposed to rectilinear input arrangements. Thus, the link 4 is as well adapted to receive rectilinear motions as well as angular motions, and it is easy to adjust the relation of the motion of said link to the motion of the N-pole of magnet 2, since such relation is variable within wide limits simply by changing the point at which pivotal connection 4b is located on the lever arm of crank arm 5.

Furthermore, mounting the magnet 2 for angular deflection such that the arc of the N-pole thereof variously converges on and diverges from the plane of core 10 makes it easy to adjust the effect of the N-pole on the core 10 since magnet 2 can be screwed into or out of sleeve 7 whereby the N-pole may be made to approach more closely to, or deviate more from, tangency with said plane at the closest approach of the N-pole to said plane. Such adjustment amounts to adjusting the field strength of said magnet or, what is the same, replacing it with a magnet of different field strength.

As shown in FIG. 1, a bobbin 13 or like coil form is mounted on leg 12 and has wound thereon a set of windings 14 corresponding to windings 22, 28 and 32 of the transduction system of FIG. 1 of the aforesaid Federici et al. application. A like bobbin 15, having a set of windings 16 thereon (see FIG. 3) is mounted on leg 11 of core 10, this latter set of windings corresponding to the windings 21, 27 and 31 of FIG. 1, Federici et al. application. While these windings may be connected in circuitry in any of the several ways shown in the Federici et al. application, FIG. 1 of the present application shows very rudimentarily the general type of circuit shown in FIG. 4 of Federici et al. Thus, load resistance 50 and a battery 51 are connected to a box labeled E which connects via a set of conductors 17 to the winding sets 14 and 16. The box E therefore may represent various entities, such as an amplifier, a demodulator, a regulator, an oscillator, a diode, etc., corresponding to similarly named elements denoted in Federici et al. by the respective reference numerals 40, 44, 47, 24, and so on, providing for maintaining a current through load resistance 50 the intensity of which is a function of the angular position of magnet 2.

In principle, the transduction system operates as disclosed in Federici et al., except that the flux lines of magnet 2 have a slightly different orientation. As will be seen from FIG. 2, the flux line pattern, looking along the axis of polarization of magnet 2 will appear to be a group of straight lines radiating from a center on said axis. Taking a pair of these lines, represented by the line segments 19 and 20, each of which cuts the leg 12 at an angle O defined as illustrated in FIG. 2, we see from FIG. 1 that these lines are curved, if viewed at right angles to the axis of polarization of magnet, and that they diverge away from each other. As in the case of Federici et al., these lines will induce flux components in leg 12 that are directed along the length of the leg, namely, components 21 and 22, and components (not shown) normal to the components 21 and 22. As in Federici et al., only the lengthwise components are effective on the sensing winding of the set of windings 14, whereas the unillustrated components have no effect. Likewise, the lengthwise components are variously rightwardly directed and leftwardly directed, and the sum of the leftward components and the sum of the rightward components depend on the angular position of the magnet 2, each said sum varying in inverse proportion to the other. (The components 21 and 22, incidentally, are depicted outside of leg 12 merely for convenience in illustration, and, of course, are actually inside the material of leg 12).

Figure 9:
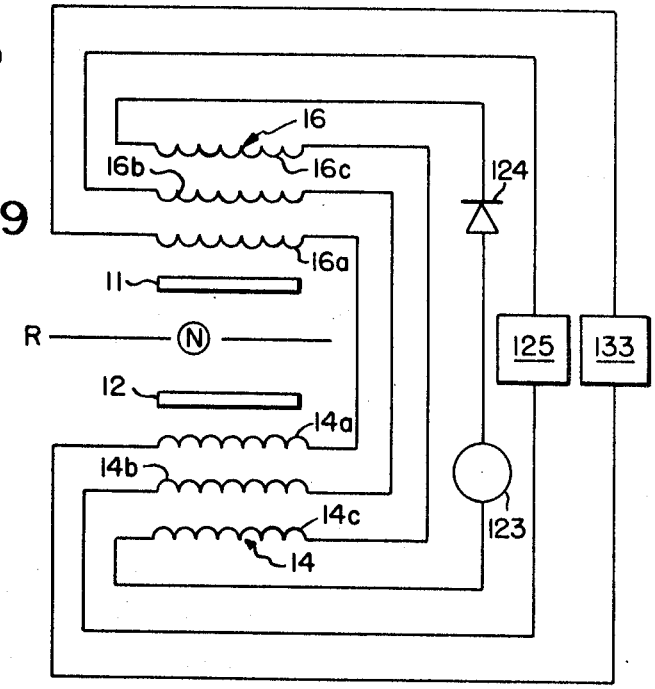
FIG. 9 illustrates application of a transducer according to the invention to a DC transduction system.

The essence of operation of the kind of transduction involved here is as illustrated in FIG. 9, wherein the N-pole of magnet 2 and the legs 11 and 12 of core 10 are illustrated in the aspect of FIG. 2, i.e., the N-pole moves to the left or right along the line R. Winding set 14 is shown to consist of three windings 14a, 14b, and 14c, and the winding set 16 is shown to consist of three windings 16a, 16b, and 16c. In each winding set, the separate windings may be taken as wound one on top of the other, though not necessarily in any particular order, and as coextensive in length.

Reference numerals 123 and 124 represent an AC source and a diode, respectively, said source of AC, said diode and windings 14c and 16c being connected in series to form a single closed loop.

Reference numeral 125 represents a voltage difference detecting device, said device and windings 14b and 16b being connected in series to form a single closed loop.

Reference numeral 133 represents a source of DC, said source of DC and windings 14a and 16a being connected in series to form a single closed loop.

Windings 14c and 16c are so wound that each pulse of DC passed by diode 124 creates the same lengthwise flux pulse in each of legs 11 and 12, except that the flux in one said leg is opposite in sense to that in the other said leg, the arrangement also being that each pulse fully saturates the respective legs.

Windings 14b and 16b are so wound that the voltages induced therein by said flux pulses are equal in magnitude but opposite in sense. Consequently, in the system of FIG. 10, as thus far described, detector 125 will detect zero voltage difference.

However, the N-pole of magnet 2 has its influence, namely, its contribution to the lengthwise flux in leg 11 will have the same direction as its contribution to the lengthwise flux in leg 12. Due to symmetry, each contribution will be equal in magnitude, whereas this magnitude will be a function of the angular position of magnet 2. Obviously, therefore each flux pulse in one of legs 11 and 12 will be augmented by magnet 2, and the corresponding flux pulse in the other of legs 11 and 12 will be diminished by magnet 2, (providing, of course, that magnet 2 is not arranged in a "neutral position", later to be described).

Therefore, the relative magnitudes of the aforesaid contributions of magnet 2 to the lengthwise flux in legs 11 and 12 will be reflected in the algebraic sum of the voltages induced in windings 14b and 16b by every half-cycle of DC and at the frequency of the AC of source 123.

In short, detector 125 senses a voltage difference, the magnitude of which represents the angular position of magnet 2. As for various reasons it is advantageous to work in terms of DC and to provide negative feedback for the transducer, windings 14c and 16c are so wound that a current of a given sense and magnitude in the loop containing said windings and DC source 133 creates the same lengthwise flux in each of legs 11 and 12 but in a sense opposing the lengthwise flux therein due to magnet 2. Therefore, if the magnitude of this current be adjusted until the detector 125 indicates zero voltage difference, then the adjusted magnitude of said current will be a measure of the angular position of magnet 2. Accordingly, in a transducer system like that shown in FIG. 1, load resistance 50 will form part of a DC loop equivalent to that defined by windings 14a and 16a and adjustable DC source 133.

For more detailed considerations as to the above-described mode of transduction, reference should be had to the aforesaid Federici et al. application. However, the present description should suffice insofar as the purposes of our application are concerned.

As indicated in FIGS. 1 and 2, the axis of the polarization of magnet 2 in a position normal to the plane of the core 10 will find the said axis of polarization parallel to a plane P, said plane P being which is normal to the plane of FIG. 1, normal to the length of leg 12, and bisecting said leg 12, leg 11, and the long dimension of winding sets 14 and 16. In other words, the axis of shaft 6 is offset from the said plane P.

Such offset is found to give optimum linearity between magnet deflection and transducer output, (as represented by the current through load resistance 50), and, at the same time, prevents the aforesaid lengthwise components of flux from attaining net value of zero per leg. Since, as will be seen from the application of Federici et al., the system operates to balance out nonzero net lengthwise components, by means of the current through load resistance 50, it results that the said current cannot drop to zero, in normal operation of the system. This latter feature is commonly desired in transduction systems, for the nonzero minimum transducer output provides a so-called "live zero."

It may be assumed, of course, that moving the magnet 2 far enough away from core 10 will drop transducer output below the above-discussed minimum. In a typical case, this sort of thing will happen if the magnet is rotated far enough in either direction from the position illustrated. However, this involves operating the transducer outside "normal operation," i.e., the desired relationship between core and magnet changes to one wherein movement of the magnet no longer determines flux conditions in legs 11 and 12 in the fashion described in connection with FIGS. 1 and 2.

It will be observed that the deviation of the magnet's N-pole from rectilinear motion is small in the vicinity of the magnet position shown in FIG. 1, and it is found, in a typical case, that magnet 2 can deflect some 13° and produce a current through load resistance 50, the magnitude of which current represents magnet position to 0.3 percent accuracy on a uniformly graduated scale. Outside this 13° range, however, the linearity required for accuracy of this sort begins to lack and at about the same point the effect of increasing distance of the N-pole from the core 10 begins to be felt as a drop in the said current, regardless of which bound of the 13° range is overstepped.

The high-output end of the 13° range is found at a point wherein the magnet's axis of polarization is approximately normal to the plane of the core. Due to the offset, the perpendicular position of the magnet will be about 6° clockwise from the position of the magnet for maximum output in the 13° range. The minimum output position of the magnet, in the 13° range, will find the magnet further clockwise of maximum with the N-pole end of the magnet substantially on the other side of the said bisecting plane from the axis of deflection of the magnet. Further clockwise movement of the magnet calls for further drop in output, but at this point the magnet is leaving not only the 13° range of good linearity but also the range of normal operation, as explained above. Moreover, in this last case, the electronics of the system may have minimum output level other than zero, independently of the transducer, so that after some point in the further clockwise movement, the system output is no longer influenced by magnet position.

The necessary offset of shaft 6 may be specified as follows. Supposing the desired output range to be 4—20 ma. DC through resistor 50, and the axis of shaft 6 to be in the aforesaid bisecting plane and parallel to the plane of core 10, then the angular position of the magnet for 12 ma. DC, the midpoint of said range, locates a point whose perpendicular distance to the said bisecting plane is substantially equal to said offset. Said point, for practical purposes, is at the center of the pole face of the N-pole of said magnet (supposing said magnet to be cylindrical and its cylindrical axis to pass through the axis defined by shaft 6), i.e., it appears that said point corresponds to the apparent point location of the N-pole of the magnet. In any event, if shaft 6 is located so that the axis thereof is parallel to both the last said planes and spaced from the said bisecting plane by said perpendicular distance, it will be offset by the amount desired for all practical purposes.

If the axis of polarization of the magnet were in the aforementioned bisecting plane, then, because of the symmetry of the core 10, the field of magnet 2 and the spatial relationship therebetween, the sum of flux component 21 and its like-directed fellows would equal the sum of flux component 22 and its like-directed fellows, and each said sum would have a sense opposite to the sense of the other. This would be a null configuration of the transducer insofar as is concerned the magnet, for no net flux would thereby be induced in legs 11 and 12 along the lengths thereof.

Figure 3:
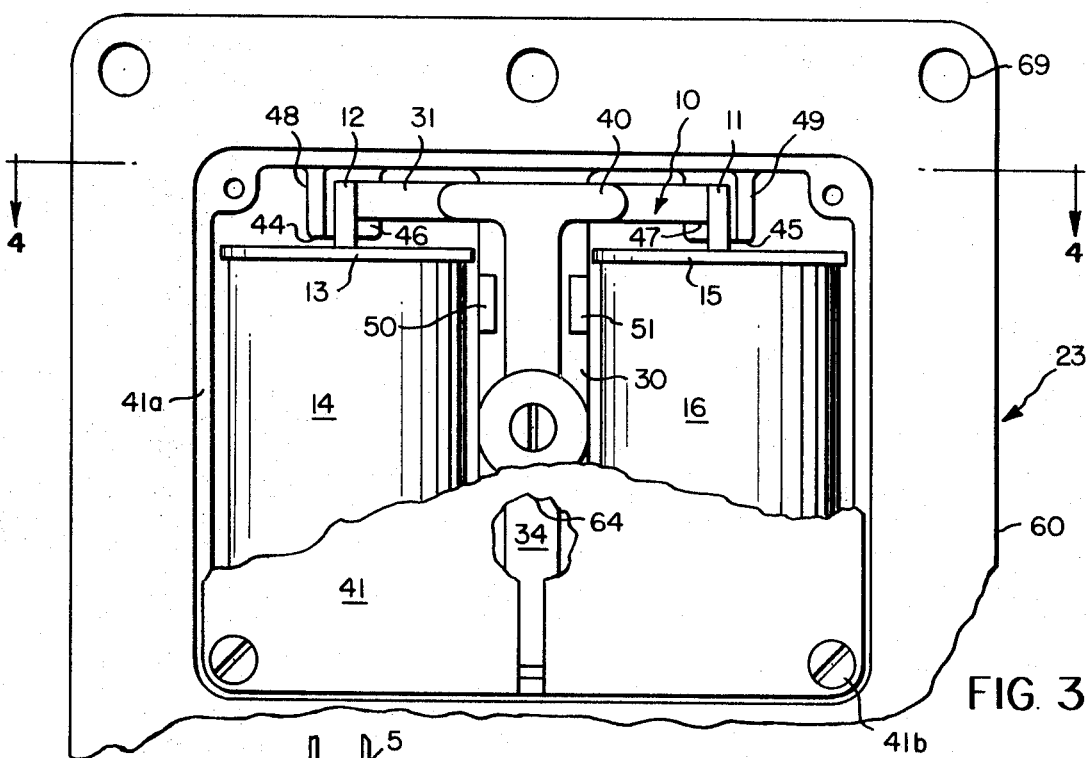
FIG. 3 is a plan view of a magnet, core, coil and housing assembly of a practical form of the aforesaid transducer.
Figure 4:
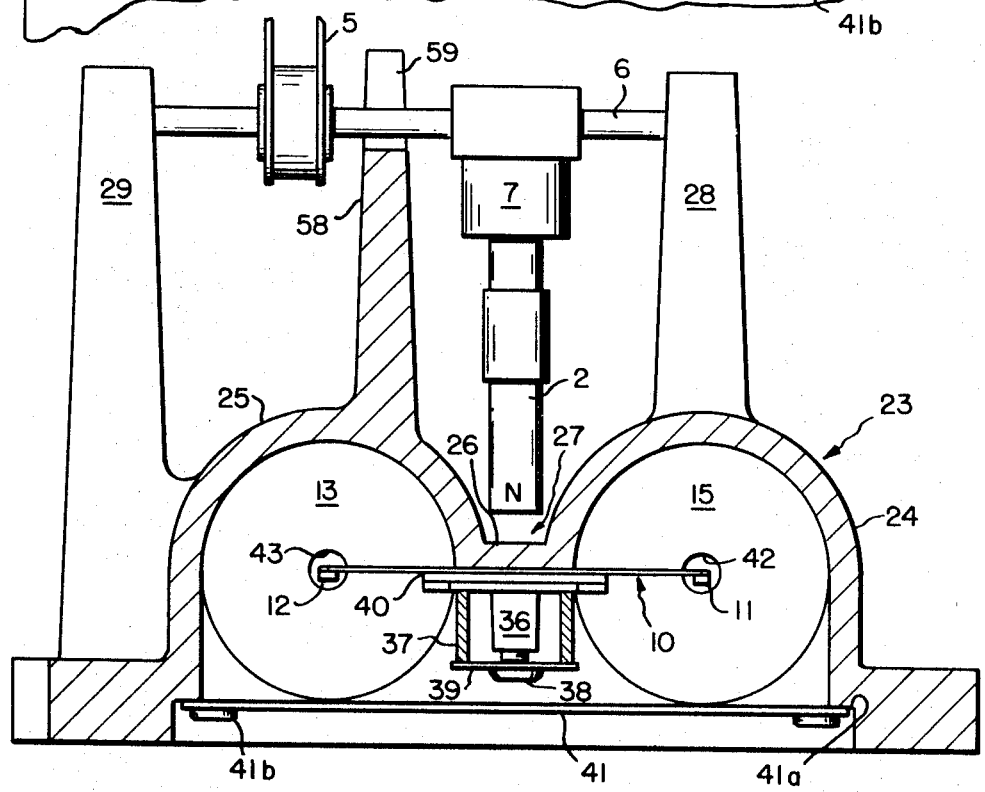
FIG. 4 is a cross section of the assembly of FIG. 3, the section being taken essentially on the line 4—4 in the direction of the arrows.

FIGS. 3 through 7 illustrate one specific form the transducer shown in FIG. 1 may take. As shown in FIG. 3, the spools 13 and 15, with the winding sets 14 and 16 thereon, are received in a shell-like casing 23, suitably cast from aluminum. Casing 23 has parallel, cylinderlike portions 24 and 25 bridged together by a web 26, so as to define a sort of trough or channel 27 allowing the N-pole of magnet 2 to extend between winding sets 14 and 16 to a distance from the plane of core 10 that is much less than a radius of said winding sets, since, in general, the sensitivity of the transducer is the lesser, the greater the distance of the N-pole from the plane of core 10.

A pair of pillars 28 and 29 provide for pivotally supporting shaft 6 on the casing 23. While the ends of shaft 6 are indicated as if simply entering the upper ends of said pillars, normally conventional bearing devices assuring low friction and providing for bodily adjustment of shaft 6 along its pivotal axis would be provided at the upper ends of said pillars. Alternately, such adjustment could be provided for at sleeve 7 to allow it to be shifted along shaft 6 to a desired position. Such adjustment, of course, is to provide for centering magnet 2 between legs 11 and 12.

The core 10 is supported in the concave part of casing 23 against the generally flat inside surface 30 of web 26, core 10 being provided with legs 31 and 32 completing with legs 11 and 12 the rectangular form of core 10 and the intermediate portions of legs 31 and 32 lying flush on surface 30, as indicated by the figures.

Legs 31 and 32 are held in their flush positions by a pair of cantilevers 33 and 34, each thereof having one end overlapping the other at 35, on a post 36 forming part of web 26 and projecting through a hole (not shown) in each such one end. A collar 37 (shown in section in FIG. 4) surrounds said post, and a screw 38 threads into said post and forces a washer 39 against said collar, which in turn forces said ends of cantilevers 33 and 34 toward the surface 30 of web 26, whereby to clamp said ends firmly to said web. Cantilevers 33 and 34 are so shaped that their outer ends, each of which may be formed as shown at 40, which denotes the outer end of cantilever 33, are thereby forced firmly against legs 31 and 32, which in turn are therefore held flush to surface 30.

According to the invention, cantilever 34 is relatively rigid as compared to cantilever 33, which latter is, as compared to cantilever 34, a cantilever spring reacting sufficiently less strongly against leg 30, than does cantilever 34 against leg 30, that temperature caused dimensional changes of core 10 in its plane causes leg 31 to slip bodily (upward or downward as seen in FIG. 3), whereas leg 32 remains fixed in place. This feature minimizes the effect of temperature on the output current of the transducer. Change in dimension of the core obviously modifies the geometrical relation between core 10 and magnet 2, but the configuration shown makes such modification symmetrical with respect to the plane of deflection of magnet 2, thereby making the effect of such modification the same in leg 11 as in leg 12. To prevent lengthwise expansion and contractions of cantilever 34 from interfering with this effect, it is preferably made from the same material as is the web 26.

The cylinderlike portions 24 and 25 receive the spools 15 and 13 snugly to the extent of substantially half the diameters of the latter, a plate 41 being provided across the concave side of casing 23 that urges the spools 15 and 13 against the inner walls of the cylinderlike portions 24 and 25, the plate 41 being made of a nonmagnetic metal having a certain amount of resiliency to assure that the spools remain immobilized. That is, plate 41 would normally seat flat on a shoulder 14a surrounding the space within casting 23. However, the said space is so dimensioned that the spools 13 and 15 project slightly above the plane of the shoulder. Accordingly, when plate 41 is forced, as by screws 41b, to seat on the shoulder, it contacts said spools and forces them tightly into portions 23 and 24.

Spools 13 and 15 are provided with axial bores 43 and 42 through which legs 12 and 11 extend with sufficient clearance in the bores that there is no possibility of the sides of said bores contacting legs 11 and 12 when the spools and core 10 are in the positions shown, (with plate 41 in place), in order that no stresses, tending to bend the elements of the core, arise upon assembly of the illustrated parts.

The core 10 is made of a soft magnetic material, such as Mumetal, which has been annealed in order to optimize its magnetic characteristics of high permeability and low retentivity. Consequently, if after annealing the core is subject to bending or other "working" of its parts, the effect of annealing is destroyed in at least some degree. Hence, to assure desired performance of the transducer, it is necessary that the manufacturing process and transducer design be such that once the annealing has taken place that neither process nor design is such that the core of the transducer be stressed such as to affect its magnetic properties.

In the present case, the only event in the manufacturing process that is apparently inconsistent with the above desideratum occurs when the core 10 is finally assembled. It is not convenient to anneal the core with winding sets 14 and 16 thereon. Hence, the core is partly assembled, as by spot welding one end of each of legs 11 and 12 to an end of, say, leg 32, resulting in a U-shaped configuration onto which the spools 13 and 15 (with winding sets 14 and 16 already thereon) may be slipped, after which the leg 31 may likewise be spot welded at its ends to the remaining ends of legs 11 and 12. However, before the spools 13 and 15 are thus emplaced, the U-shaped configuration and the leg 31 are annealed to the desired state of magnetic softness (as indicated by a Vickers hardness number for the annealed core of about, but not more than 145). After this, spools 13 and 15 may be emplaced, leg 31 spot welded to the ends of legs 11 and 12, and the assembly otherwise completed, taking due care not to bend the core parts.

The step of spot welding the ends of leg 31 to the U-shaped configuration formed by legs 11, 12 and 32, has sufficiently little effect on the core properties as a whole that it is negligible, and once the core 10 is in place as illustrated in FIG. 3, it is thereafter safe from stress.

As FIG. 3 indicates, two corners of the core 10 are supported on abutments 44 and 45, which have flats 46 and 47 thereon, which flats are in the same plane as the flat surface 30 of web 26. The other corners of core 10 are similarly supported by a pair of flatted like abutments, not visible in FIG. 3 because of the presence of the fragmentary showing of plate 40. The four abutments are also provided with guides such as shown in 48 and 49 projecting up from flats 46 and 47, which guides act mainly as approximate guide for positioning the core during the process of assembling the transducer. Other guides 50 and 51 on flat surface are provided for cantilever 33, and similar guides (not visible because of the fragment of plate 41) are provided on flat surface 30 for cantilever 34.

To provide increased efficiency, the legs of the core may be constructed as shown in FIG. 8, using leg 11 as an example. As shown, the leg 11 is composed of two similar flat rectangular strips or laminae 11a and 11b spotwelded at 11c and 11d together. The thickness of each such strip is chosen to be twice the depth to which the saturating winding creates flux in the strip. Thus, for 60-cycle excitation, each strip is made 0.006-inch thick, which means that the composite of strips 11a and 11b give the effect of four 0.003-inch laminae, each of which is completely penetrated by the AC field of the winding. The several spot welds (namely, 11c and 11d, as well as those referred to previously by which leg 11 would be secured to the other legs of the core) form only a minor hiatus in this four-fold aspect of leg 11. It will also be observed that a single homogeneous 0.012-inch thick strip would have no internal zone 0.006 -inch thick that would not be directly affected by the AC field, and therefore would not saturate as efficiently as does the leg 11 as shown in FIG. 8. As the width of leg 11 in practice would be about 0.1 inch, a substantial internal portion of a homogeneous 0.012-inch thick strip would not be directly affected by the field. Sides 31 and 32 may be constructed in like fashion.

The structure thus far described is intended to be housed in a pair of nesting covers, indicated generally at 52 and 53 in FIG. 1, inner cover 52 being a shield of Mumetal, or the like, and outer cover 53 being mainly a protective cover for cover 52.

As FIGS. 1, 6 and 7 indicate, covers 52 and 53 are essentially parallelelipipedal except that the top portions 54 and 55 from the view of FIG. 6 are substantially reduced in width and trapezoidal in cross section. The actual shape is of no particular importance so long as the covers do not significantly affect the operation of the transducer. As shown, since the covers are generally rather further from magnet 2 than are the parts of core 10, and are more or less bilaterally symmetric with respect to the plane of deflection of magnet 2, thereby such result is achieved.

The trapezoidal parts 54 and 55 of the covers 52 and 53 are slotted as indicated at 56 in the case of part 55, the slot of part 54 being more or less precisely under slot 56 as seen in FIG. 7, and hence not visible.

The said slots accommodate the crank arm 5, shown rudimentarily in FIG. 7, so that the motions of link 4 are transferred to the shaft 6 within the cover. A steel strap 57 is provided on trapezoidal part 55 that covers sufficient of slot 56 (on both sides of part 55) to act as stops limiting the deflection of crank 5 to a range approximately the full range of output from the transduction system, and to provide a certain amount of magnetic shielding to make up for the hiatus in the shielding caused by slot 56 and its not visible counterpart in cover 52.

The space between the top portion of cover 52 and the convex side of casing 23 is divided into two parts by a partition 58 substantially filling the partly rectangular, partly trapezoidal cross section of cover 52, as seen in FIG. 6, partition 58 being a nonmagnetic element, conveniently formed as part of the casting making up nonmagnetic casing 23. Partition 58 is provided with a slot 59 providing for shaft 6, so that the magnet 2 is more or less shut off from the space within the cover 53 and to the left of partition 58. The purpose of this construction is to keep magnetic dust from getting to the magnet 2 and affecting the pattern of its magnetic field. Thus, such dust would have to follow a tortuous path including the said slots, and the slot 59, in order to get at magnet 2. As cover 52 is of Mumetal, partition 58 will be of slightly lesser proportions than would be needed for a precise fit in cover 52, so as to avoid contact with and possible deformation of the cover 52.

Covers 52 and 53 are continuous shells open only at the said slots and at their bottoms.

The opening in the bottom of cover 52 fits snugly on a rectangular flange 60 forming a base for casing 23, and conveniently having been formed as an integral part thereof. Cover 52 extends just far enough below the lower flat surface of flange 60 to fit flush to the flat upper surface of a body denoted by the reference character E. Normally, body E would be more or less a sealed box or housing containing the electronics of the transduction system, as contemplated in FIG. 1. The body E is provided with a raised surface 61 which fits either flush to the flange 60 or, as shown, to a flat plate 62 having the outer shape of the bottom surface of flange 60 as shown in FIG. 3. Said plate is made of Mumetal in order to provide good magnetic shielding at the junction of casing 23 and body E.

Plate 62 has a hole 63 therethrough permitting the leads to winding sets 14 and 16 to exit from the casing 23 (via a hole 64 in plate 41, see FIG. 3), through hole 63, through a hole 65 in a Mumetal plate 66 on a shoulder 68 surrounding a bore 67 in body E and thence via bore 67 to the main space (not shown) inside body E, wherein the electronics are located. As a result, looking up through bore 67, a substantially continuous expanse of Mumetal, except for the relatively small hole 65 and a narrow annular gap 64 between plate 62 and plate 66, covers the open bottom of Mumetal cover 52.

Looking at the total construction contemplated in FIGS. 6 and 7, it will be seen that the magnet 2, core 10 and winding sets 14 and 16 are substantially completely enclosed in a shell of soft magnetic material, say Mumetal. At the same time, the magnet 2, while sealed off by casing 23 from the interior thereof and from body E is substantially cut off from magnet dust in the atmosphere external to the transducer. The cover 23 furthermore prevents escape of flame from its interior, and/or that of the box E, to the atmosphere external to the transducer. Though plate 62 is made of a material which more or less prevents the plate from having the effect of a gasket, it is nevertheless found that the presence of plate 62 does not facilitate escape of flame. Therefore, while the housing and support structure for the transducer may appear somewhat complex, it serves a complex purpose.

However, the complexity of the said housing and support structure is also due to the idiosyncracies of the magnetic shielding material, which, like core 10, must be annealed to develop its shielding effect to the proper degree and must be used carefully lest such effect be vitiated by stressing the material in assembling the transducer or by designing it so that such stress exists in the assembled state of the transducer.

In the present instance, the various shielding parts are designed so that they fit, insofar as possible snugly together without there being substantial stresses due to the snugness. As illustrated, various screws would be used to fasten various of said parts together, with the result that substantial stresses in the shielding may exist in some instances. However, the stress due to screws does not introduce intolerable effects on the shielding action, and as long as the clamping force on plate 62 (if used) remains within reasonable limits, no problems with the magnetic shielding characteristics of said gasket arises. The plate 62 may be clamped tightly enough (as by screws such as indicated at 70, FIG. 6, projecting through holes, such as indicated at 69, FIG. 3, and into body E) that no flame path exists between the said plate and the surfaces juxtaposed thereto. In some cases, however, expansion due to temperature changes can cause changes in the magnetic characteristics of gasket 62, to sufficient extent to affect the calibration of the transducer, the effect being that the gasket hardens, so to speak, and may become sufficiently magnetized permanently to affect the flux in core 10 due to magnet 2. It is to be observed that no clamping forces in the illustrated shielding construction subject Mumetal parts to other than compressive stress, and the clamping forces required are of sufficiently low order that the compressive stress is not sufficient to deform the Mumetal and therefore does not modify the properties of the Mumetal.

The inner cover 52 and other Mumetal parts account for substantially the entire magnetic shielding requirement. However, it is desirable to provide the outer cover 53 to serve various purposes such as to protect cover 52 from knocks with tools and contacts with magnetized members. By making cover 53 of ordinary steel, the protective purpose is served, and, as well, some additional magnetic shielding is gained.

As shown, cover 53 follows the contour of cover 52 quite closely, but definitely out of contact therewith, being supported on flange 60 by suitable screws, such as indicated at 71, spacers, such as shown at 72, being provided to allow the cover 53 to clear the cover 52, and various screws, such as shown at 73, holding cover 52 in place on flange 50.

It will be seen that strap 57 effectively forms an integral part of cover 53, and in fact, cover 53 could be formed in the first place so that the slot 56 is just the size to which strap 57 is used to reduce it to. However, it is preferred to make strap 57 a separate part, since when it is not in place, the interior of cover 53 is more readily accessible, for purposes of assembly, repair, etc., of the transducer. In any case, since the effective limiting edges (one thereof being indicated at 74 in FIG. 7) of slot 56, are not part of the inner cover 52, said edges serve as stops, whereas corresponding parts of cover 52 could not, due to the fact that use as stops might stress the material of cover 52, to such extent as to deleteriously affect the magnetic properties of cover 52.

Furthermore, the transducer is somewhat sensitive to its past history. For example, if magnet 2 is moved outside of its normal 13° or so range, recalibration may be required. Moreover, as previously pointed out, if the magnet moves in a direction such as to increase the current through load resistance 50, after a point, further motion of the magnet in that direction finds the load current decreasing. Hence, the said limiting edges not only protect shielding 52 but also serve other useful purposes.

While we have described our invention in full detail and in the best form known to us thus far, it is evident that various modifications can be made thereof without departing from the invention, as claimed hereinbelow. For example, while it is expedient, in certain of the attached claims, to characterize legs 11 and 12 as parallel, or core 10 as square, the core 10 might well be circular or otherwise shaped. Again, certain liberties may be taken with regard to the symmetry of the transducer configuration. For example, dissymmetry of the relative magnetic properties of the legs 11 and 12 could be indulged in if there were provided an opposing dissymmetry of windings, say, as to relative numbers of turns or the like, and vice versa. Accordingly, we believe that variations such as this are within the scope of our claims.

We claim:

1. A magnetic flux transducer having a four-cornered closed core having leg portions extending from corner to next adjacent corner, and a rigid support therefore having 6 abutments contacting the four corners of said core and two opposite leg portions, said support being otherwise spaced from said core; first clamping means rigidly clamping one of said two opposite leg portions to that one of said abutments contacting said one of said opposite leg portions; second clamping means having a member yieldingly urged toward that one of said abutments contacting the other of said opposite leg portions, said other of said opposite leg portions being located between said member and the last said abutment said second clamping means and the last said leg portion being so constructed and arranged that changes in length of the remaining leg portions cause said last said leg portion to slide over said last said abutment while remaining in contact with said last said abutment and said member, said core being made of magnetic material.

2. The invention of claim 1, wherein said last said leg portion is a flat strip, said last said abutment is flat, and said member has a flat surface element; the flats thereby defined being in parallel with each other, and said core being subject to expansion thereof in directions along said flats.

3. The invention of claim 2, wherein said member is a cantilever spring, one end of which is clamped to said support and the other end thereof has said flat surface, and said spring being constructed and arranged such as to yieldingly force said other end against said flat strip.

4. The invention of claim 1, wherein said support has recesses receiving coils mounted on said remaining leg portions, each said recess being so formed and dimensioned that with said core having such coils thereon, being mounted on said support with said coils received in said recesses, and having the said six abutments contacting said core element, said core element has the same configuration it had prior to being so mounted on said support.

5. The invention of claim 4, wherein said support is in the form of a shell substantially enclosing said core with said coils thereon, said shell having an opening via which said core with said coils thereon can be mounted respectively on said abutments and in said recesses without altering the configuration of said core; and there being a plate substantially covering said opening, said plate having portions urging said coils against the bottoms of said recesses.

6. In a magnetic flux transducer having a core and means providing a magnetic field, for varying the flux in said core, such variation being a function of the orientation of said core with respect to said field, said core having legs, each such leg consisting of a length of soft magnetic material, each said length consisting of a pair of strips of soft magnetic material each being equally long and their lengths parallel to each other to define a composite strip of like length, the thickness of each strip being substantially twice the depth to which said field is effective in creating saturating flux in said strip, said strips being oriented to one another such that said composite strip is substantially four times the said depth, and there being spot welds spaced along said lengths joining the one said strip to the other said strip so as to define said composite strip; said transducer also having means for producing such magnetic field with such variation as to periodically saturate said core leg means of said flux-inducing effect.